United States Patent
Ober et al.

(10) Patent No.: US 8,892,820 B2
(45) Date of Patent: Nov. 18, 2014

(54) METHOD AND SYSTEM FOR LOCAL CACHING OF REMOTE STORAGE DATA

(75) Inventors: Robert E. Ober, San Jose, CA (US); Bret S. Weber, Wichita, KS (US); Robert W. Warren, Jr., Loveland, CO (US)

(73) Assignee: NetApp, Inc., Sunnyvale, CA (US)

( * ) Notice: Subject to any disclaimer, the term of this patent is extended or adjusted under 35 U.S.C. 154(b) by 387 days.

(21) Appl. No.: 12/981,294

(22) Filed: Dec. 29, 2010

(65) Prior Publication Data
US 2011/0231613 A1 Sep. 22, 2011

Related U.S. Application Data

(60) Provisional application No. 61/315,528, filed on Mar. 19, 2010.

(51) Int. Cl.
| | |
|---|---|
| *G06F 12/00* | (2006.01) |
| *H04L 29/08* | (2006.01) |
| *H04L 12/861* | (2013.01) |
| *G06F 12/08* | (2006.01) |

(52) U.S. Cl.
CPC ........ *G06F 12/0868* (2013.01); *H04L 67/2842* (2013.01); *H04L 67/1097* (2013.01); *H04L 67/289* (2013.01); *G06F 2212/264* (2013.01); *H04L 49/9073* (2013.01); *H04L 49/90* (2013.01)
USPC ................... 711/133; 711/E12.039

(58) Field of Classification Search
USPC .......................................... 711/133, E12.069
See application file for complete search history.

(56) References Cited

U.S. PATENT DOCUMENTS

| | | | |
|---|---|---|---|
| 6,516,344 B1 | 2/2003 | Nazari | |
| 6,925,533 B2 | 8/2005 | Lewis | |
| 7,036,040 B2 * | 4/2006 | Nicholson et al. | 714/6.31 |
| 7,120,673 B2 * | 10/2006 | Kitamura et al. | 709/213 |
| 7,356,581 B2 * | 4/2008 | Hashimoto | 709/224 |
| 7,552,197 B2 | 6/2009 | Soltis | |
| 7,688,867 B1 * | 3/2010 | Kizhepat | 370/532 |
| 2006/0248292 A1 | 11/2006 | Suresh | |
| 2007/0198710 A1 | 8/2007 | Gopalakrishnan | |
| 2009/0043971 A1 * | 2/2009 | Kim | 711/150 |
| 2009/0292861 A1 * | 11/2009 | Kanevsky et al. | 711/103 |

OTHER PUBLICATIONS

U.S. Appl. No. 61/315,528, filed Mar. 19, 2010, by Robert E. Ober.

* cited by examiner

*Primary Examiner* — Mardochee Chery
(74) *Attorney, Agent, or Firm* — Haynes and Boone, LLP (57) ABSTRACT

Disclosed is a storage system. A network interface device (NIC) receives network storage commands from a host. The NIC may cache the data to/from the storage commands in a solid-state disk. The NIC may respond to future network storage command by supplying the data from the solid-state disk rather than initiating a network transaction.

20 Claims, 6 Drawing Sheets

METHOD AND SYSTEM FOR LOCAL CACHING OF REMOTE STORAGE DATA

CROSS-REFERENCE TO RELATED APPLICATION

This application is based upon and claims priority to U.S. provisional application Ser. No. 61/315,528, filed Mar. 19, 2010, by Robert Ober, entitled "Remote Storage Caching." This application is related to U.S. application Ser. No. 12/981, 181 filed the same day as the present application, by Robert Ober, entitled "Coherent Storage Network." The entire content of both applications is specifically incorporated herein by reference for all that it discloses and teaches.

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks that are accessed via a network. These arrays (which may also be known as storage servers) may be configured in ways that provide redundancy and error recovery without any loss of data. Accessing these arrays via a network allows centralized management and improved resource optimization. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID).

SUMMARY OF THE INVENTION

An embodiment of the invention may therefore comprise a method of communicating with a storage server across a network, comprising: receiving, from a host, at a network interface device, a first read from network storage command and a second read from network storage command; in response to the first read from network storage command, retrieving, via said network, data requested by said first read from network storage command from said storage server; in response to the first read from network storage command, storing, by said network interface device, said data in solid state storage coupled to said network interface device; and, in response to said second read from network storage command, retrieving said data from said solid state storage by said network interface device.

An embodiment of the invention may therefore further comprise a method of communicating with a storage server across a network, comprising: receiving, from a host, at a network interface device, a write to network storage command and a read from network storage command; in response to the write to network storage command, sending, via said network, data written by said write to network storage command to said storage server; in response to the write to network storage command, storing, by said network interface device, said data in solid state storage coupled to said network interface device; and, in response to said read from network storage command, retrieving said data from said solid state storage by said network interface device.

DETAILED DESCRIPTION OF THE EMBODIMENTS

Figure 1:
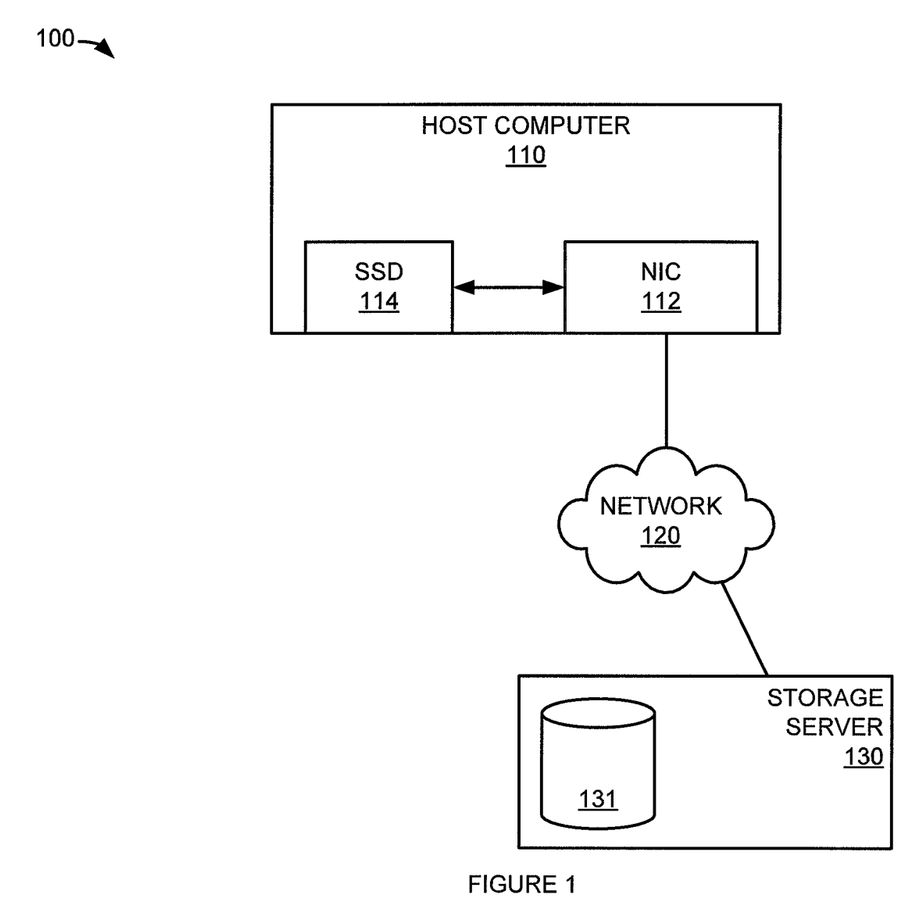
FIG. 1 is a block diagram of a storage system.

FIG. 1 is a block diagram of a storage system. In FIG. 1, storage system 100 includes host computer 110, network 120, and storage server 130. Host computer 110 includes or is operatively coupled to network interface card (NIC) 112 and solid state disk (SSD) 114. NIC 112 is operatively coupled to SSD 114. NIC 112 is also operatively coupled to network 120. Network 120 is operatively coupled to storage server 130. Storage server 130 includes disk drive 131. SSD 114 may include flash memory.

Network 120 may be any network or collection of networks that couple, link, or otherwise operatively connect host 110 with other devices or systems. Network 120 may include other secondary data networks. In an example, network 120 may include a backhaul network, a local network, a long distance network, a packet network, the internet, or any combination thereof, as well as other types of networks.

In an embodiment, remote storage commands and data destined for storage server 130 via network 120 pass through NIC 112. NIC 112 may accelerate and manage the protocols for remote storage access. Typically, these remote storage commands are sent to NIC 112 via an interface, such as a PCI, or PCI-express (PCIe) interface. The remote storage commands may be sent to storage server 130 via a second interface, such as an Ethernet (or other IP network) interface. The remote storage commands sent to storage server 130 may conform to an Internet Protocol (IP)-based storage networking standard for linking data storage facilities. These standards include iSCSI, fiber channel (FC), and fiber channel over Ethernet (FCoE).

NIC 112 may duplicate writes (or the data for the write) to storage server 130 and send them to SSD 114. NIC 112 may also intercept subsequent reads of data previously sent to SSD 114 and satisfy the read by retrieving the data from SSD 114 (and not storage server 130). NIC 112 may organize the data stored on SSD 114 using cache coherency algorithms. In an embodiment, NIC 112 uses a write-though cache coherency algorithm so that the data stored on SSD 114 is always consistent with the data stored by storage server 130. In an embodiment, entries in SSD 114 may be tagged with a virtual machine identifier. In an embodiment, entries in SSD 114 may be tagged with a logical unit number (LUN).

When data is read from storage server 130, it may also be placed in SSD 114 to satisfy future reads of that same data. When this happens, NIC 112 may replace (overwrite) an entry in SSD 114 with the new data. NIC 112 may select the entry in SSD 114 to replace based on a cache replacement algorithm. For example, NIC 112 may select and entry on SSD 114 to replace based on the how long the entry has been in SSD 114. In another example, NIC 112 may select an entry on SSD 114 to replace based on the how long the entry has been in SSD 114 without having been read and/or written. In order to read and write data from SSD 114 in response to remote storage read/write commands, NIC 112 may include a solid state storage controller.

In an embodiment, when data is written to storage system 130, NIC 112 may pass that write command (and data) to storage server 130. Any entries in SSD 114 with matching tag information may be cleared. In this way, coherency between data in SSD 114 and data on storage server 130 is maintained. Failure conditions in host 110, NIC 112, or SSD 114 do not corrupt the master copy of the data stored by storage server 130. In an embodiment, when data is written to storage system 130, it may be both written to storage system 130 and stored in SSD 114.

Storage system 100 has the performance advantages of a flash memory based storage system that is directly attached to host 110, but with the centralized storage of storage system 130. Storage system 100 also reduces the amount of traffic sent through network 120 because remote storage commands that can be satisfied by data stored on SSD 114 do not need to be sent across network 120.

Because SSD 114 acts like a cache for storage system 130, problems associated with flash wear out, retention, or failure, are reduced because there is always a master copy of the data stored in storage system 130 (e.g., on disk 131). A failing or weak flash device in SSD 114 may be mapped out of the area being used on SSD 114 to cache data. As long as the cache maintained on SSD 114 is large enough to maintain a working set of data, little or no performance impact should occur.

Figure 2:
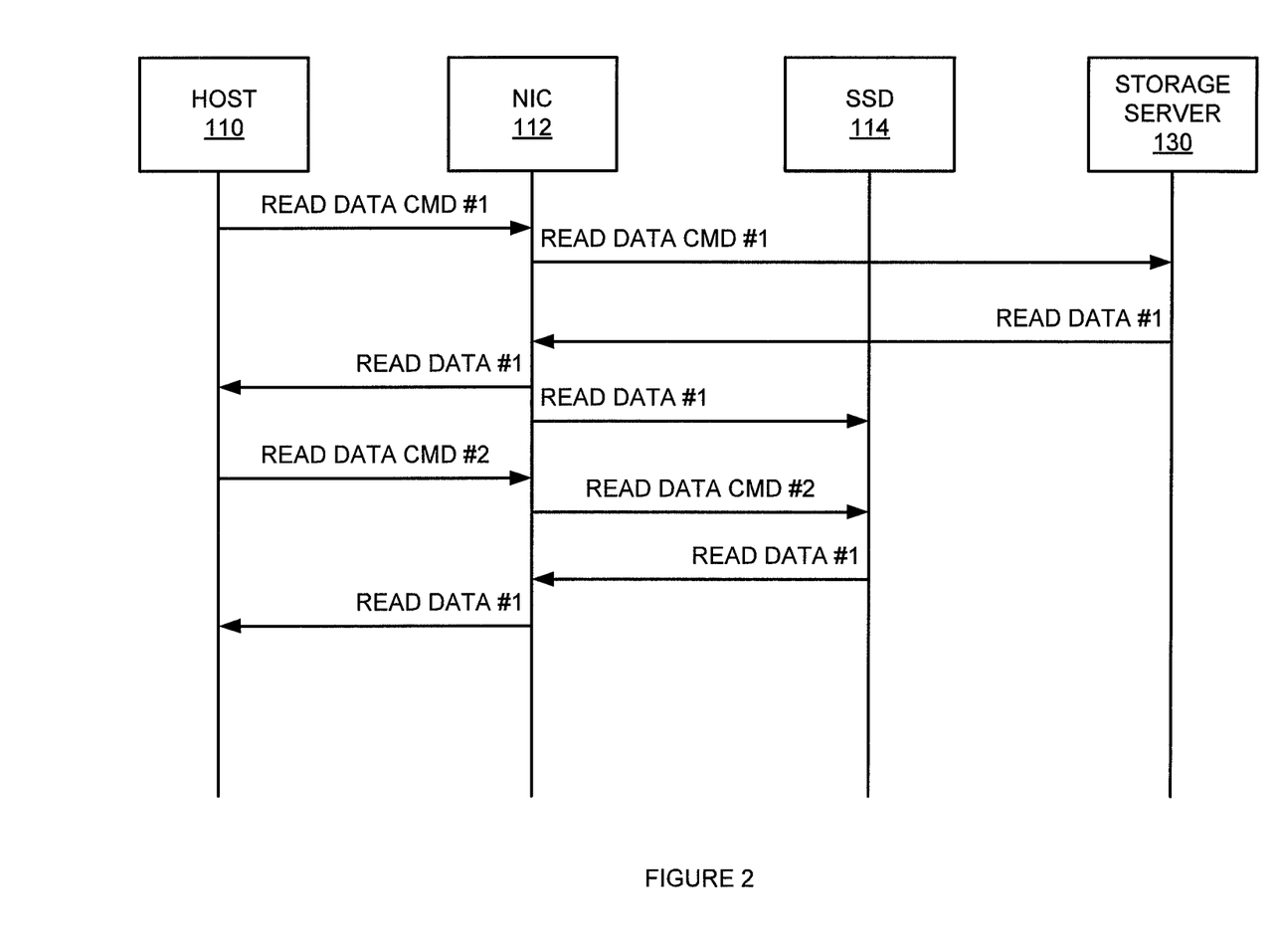
FIG. 2 is a flow diagram of a method of communicating with a storage server across a network.

FIG. 2 is a flow diagram of a method of communicating with a storage server across a network. The flows and steps illustrated in FIG. 2 may be performed by one or more elements of storage system 100. Host 110 sends a first remote storage command to NIC 112. For example, host 110 may send a block read command which is routed to NIC 112 by software, hardware, or a combination of the two. This block read command may be interpreted, re-formatted, or converted into another protocol. For example, NIC 112, or its associated driver software may convert the block read command into an iSCSI, FC, or FCoE command. The converted (or unconverted) command is sent to storage server 130 via network 120.

In response to the command sent via NIC 112 and retrieved via network 120, storage server 130 sends read data #1 back to NIC 112. NIC 112 passes read data #1 back to host 110. NIC 112 also sends read data #1 to SSD 114. NIC 112 sends read data #1 to SSD 114 for storage in association with cache coherency tags.

Host 110 sends a second remote storage command to NIC 112 to read the same location in storage server 130. In response, NIC 112 determines that read data #1 is also stored in SSD 114. Thus, NIC 112 sends the second read data command to SSD 114 to retrieve read data #1. SSD 114 sends the cached read data #1 back to NIC 112. NIC 112 passes read data #1 to host 110. In an alternative embodiment, NIC 112 may retrieve the cached read data #1 directly from SSD 114 without sending the second read data command.

Figure 3:
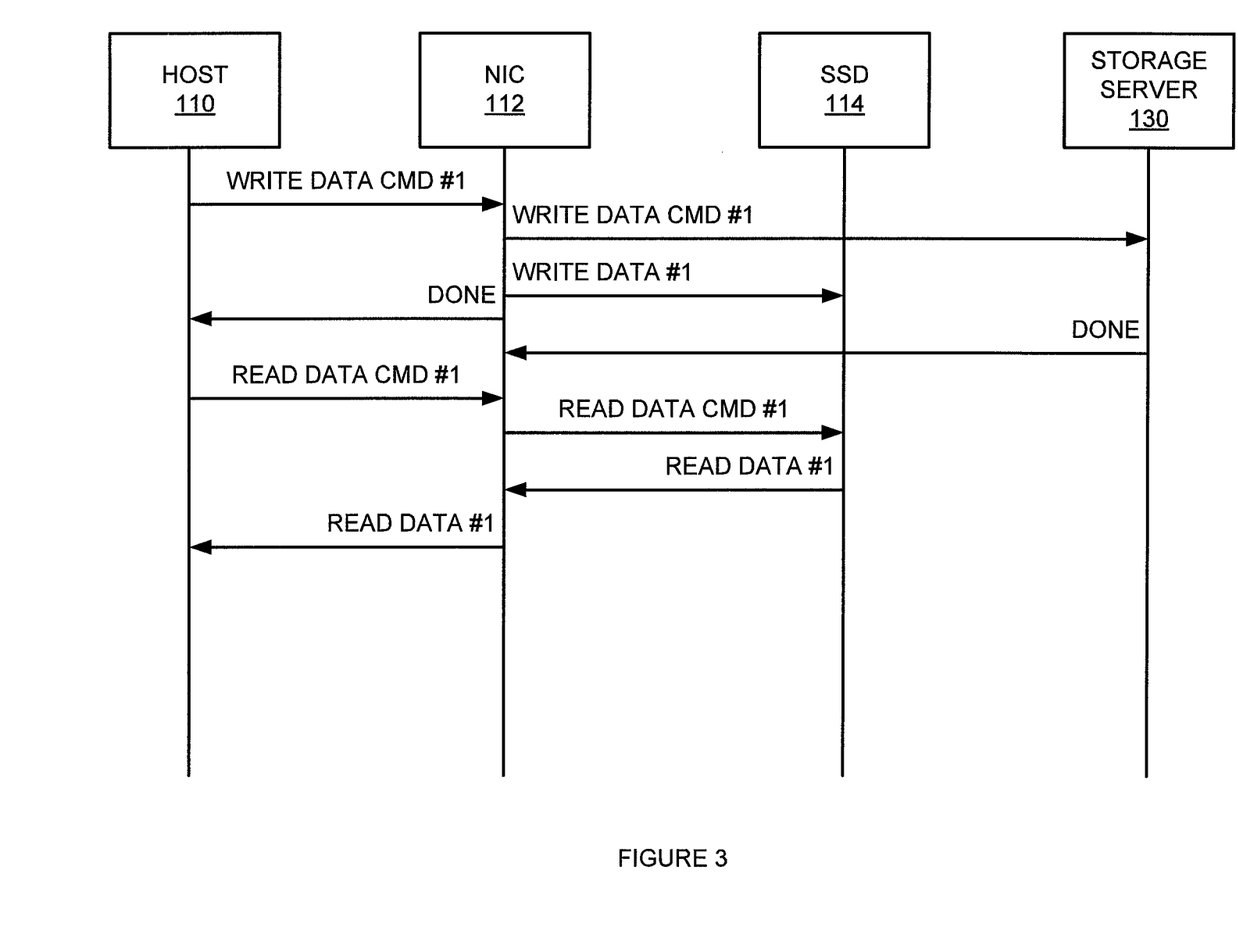
FIG. 3 is a flow diagram of a method of reading from, and writing to, a storage server across a network.

FIG. 3 is a flow diagram of a method of reading from, and writing to, a storage server across a network. The flows and steps illustrated in FIG. 3 may be performed by one or more elements of storage system 100. Host 110 sends write data to remote storage command to NIC 112. For example, Host 110 may send a block write command which is routed to NIC 112 by software, hardware, or a combination of the two. This block write command may be interpreted, re-formatted, or converted into another protocol. For example, NIC 112, or its associated driver software may convert the block write command into an iSCSI, FC, or FCoE command. The converted (or unconverted) command is sent to storage server 130 via network 120. NIC 112 also sends write data #1 to SSD 114 for storage in association with cache coherency tags. NIC 112 may optionally inform host 110 that the write operation is done. NIC 112 may optionally inform host 110 that the write operation is done before NIC 112 is informed by storage server 130 that it has completed the write operation. If storage server 130 fails to successfully complete the block write command, NIC 112 may launch another block write command to storage server 130 using the data stored on SSD 114.

Host 110 sends a second remote storage command to NIC 112 to read the location in storage server 130 written by the write data command. In response, NIC 112 determines that read data #1 is also stored in SSD 114. Thus, NIC 112 sends the second read data command to SSD 114 to retrieve read data #1. SSD 114 sends the cached read data #1 back to NIC 112. NIC 112 passes read data #1 to host 110. In an alternative embodiment, NIC 112 may retrieve the cached read data #1 directly from SSD 114 without sending the second read data command.

Figure 4:
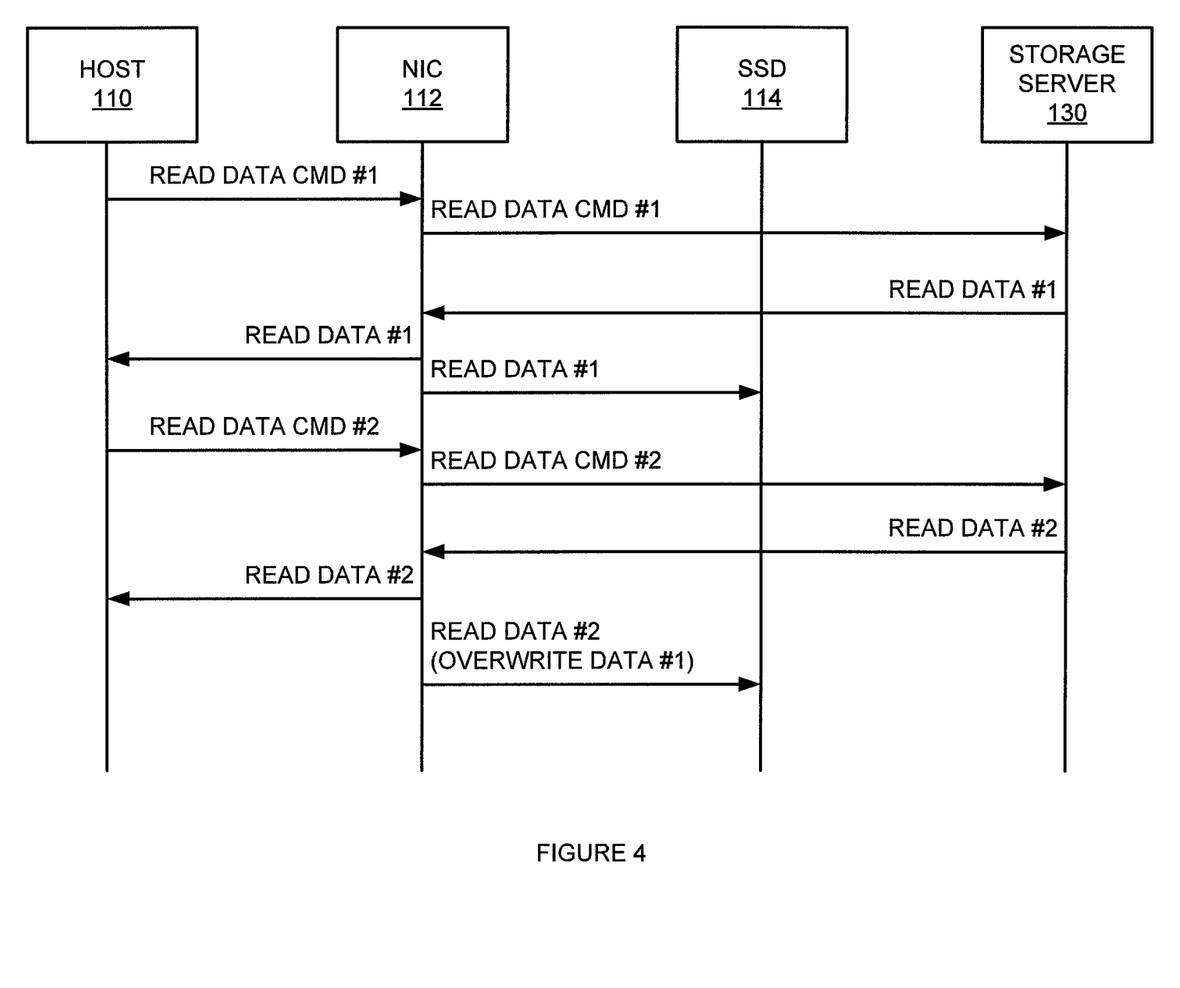
FIG. 4 is a flow diagram of a method of reading from a storage server across a network.

FIG. 4 is a flow diagram of a method of reading from a storage server across a network. The flows and steps illustrated in FIG. 4 may be performed by one or more elements of storage system 100. Host 110 sends a first remote storage command to NIC 112. For example, host 110 may send a block read command which is routed to NIC 112 by software, hardware, or a combination of the two. This block read command may be interpreted, re-formatted, or converted into another protocol. For example, NIC 112, or its associated driver software may convert the block read command into an iSCSI, FC, or FCoE command. The converted (or unconverted) command is sent to storage server 130 via network 120.

In response to the command sent via NIC 112 and network 120, storage server 130 sends read data #1 back to NIC 112. NIC 112 passes read data #1 back to host 110. NIC 112 also sends read data #1 to SSD 114. NIC 112 sends read data #1 to SSD 114 for storage in association with cache coherency tags.

Host 110 sends a second remote storage command to NIC 112 to read a location in storage server 130 that is not cached in SSD 114. In response, NIC 112 determines that read data #2 is not stored in SSD 114. Thus, NIC 112 sends the second read data command to storage server 130 to retrieve read data #2. In response, storage server 130 sends read data #2 to NIC 112 via network 120. NIC 112 sends read data #2 to host 110.

NIC 112 also sends read data #2 to replace (or overwrite) an entry in SSD 112 with read data #2. The entry overwritten may be read data #1. NIC 112 may select the entry on SSD 114 to replace based on a cache replacement algorithm. For example, NIC 112 may select an entry on SSD 114 to replace based on the how long the entry has been in SSD 114. In another example, NIC 112 may select and entry on SSD 114 to replace based on the how long the entry has been in SSD 114 without having been read and/or written.

Figure 5:
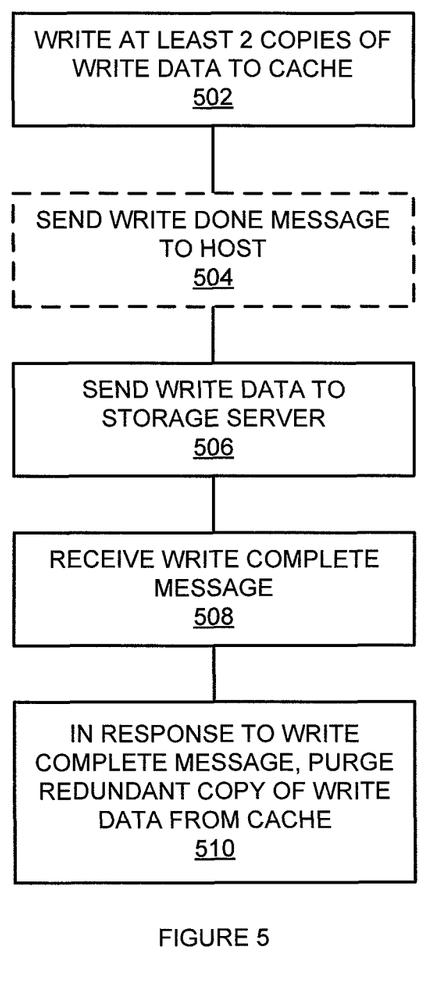
FIG. 5 is a flowchart of a method of operating a storage system.

FIG. 5 is a flowchart of a method of operating a storage system. The steps illustrated in FIG. 5 may be performed by one or more elements of storage system 100. At least two copies of write data are written to a storage cache (502). For example, NIC 112, in response to a write to network storage command received from host 110, may write two copies of the write data to SSD 114. This redundancy is in effect RAID-1 redundancy. In other embodiments, more copies, or more copies with additional error detection and correction may be written. For example, other RAID levels (such as RAID levels 2-6) may be written to SSD 114.

Optionally, a write done message is sent to host (504). For example, before a write done (or write complete) message is received from storage server 130, NIC 112 may send a write done message to host 110. This allows host 110 to continue processing without having to wait for delays attributable to network 120, storage server 130, and/or disk 131.

The write data is sent to a storage server (506). For example NIC 112 may forward the write data command received from host 110 to storage server 130. In another embodiment, NIC 112, after storing the redundant copies in SSD 114 and optionally sending a write done message to host 110, may send a write data command to storage server 130 with the write data. NIC 112 may perform this task in the background. NIC 112 may perform this task at times when network 120 traffic, host 110, or storage server 130, are not very busy. Because the data is first written into SSD 114, than at a later time written to master storage (i.e., storage server 130) this may be seen as a delayed write commit.

A write complete message is received (508). For example, storage server 130, in response to the write data command sent by NIC 112, may send a write complete message to NIC 112. In response to the write complete message, a redundant copy of the write data is purged from the cache (510). For example, NIC 112 may remove a redundant copy of the write data from SSD 114 once it knows that there is another copy stored in storage server 130.

These steps help provide the reliability of RAID protection before a write-through completes. It also helps provide the reliability of RAID protection after the write-through completes becauser there are still at least two copies of the written data in the system—one in SSD 114 (i.e., the cache), and one in master storage (i.e., storage system 130). As discussed above, these steps (and system) may also improve performance because host 110 may continue processing without having to wait for delays attributable to network 120, storage server 130, and/or disk 131. This continued processing may allow re-ordering of critical reads ahead of the writes to storage system 130 thus improving performance.

The systems, engines, databases, processors, modules, networks, servers, methods, and functions described above may be implemented with or executed by one or more computer systems. The methods described above may also be stored on a computer readable medium. Many of the elements of storage system 100 may be, comprise, or include computers systems. This includes, but is not limited to, host 110, NIC 112, SSD 114, network 120, storage server 130, and disk 131.

Figure 6:
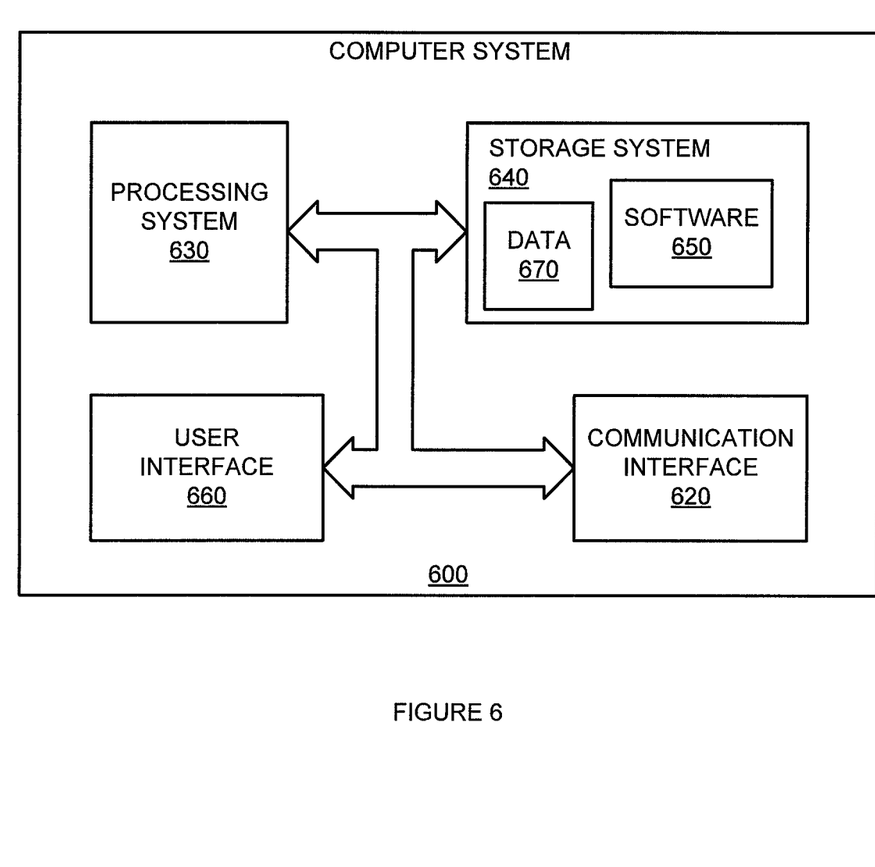
FIG. 6 is a block diagram of a computer system.

FIG. 6 illustrates a block diagram of a computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, network storage, server, or other memory function. Storage system 640 may be a computer readable medium. Storage system 640 may be distributed among multiple memory devices.

Processing system 630 retrieves and executes software 650 from storage system 640. Processing system may retrieve and store data 670. Processing system may also retrieve and store data via communication interface 620. Processing system 650 may create or modify software 650 or data 670 to achieve a tangible result. Processing system may control communication interface 620 or user interface 670 to achieve a tangible result. Processing system may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of communicating with a storage server across a network, comprising:

receiving, from a first host, at a network interface device, a first read from network storage command directed to a location in said storage server and a second read from network storage command directed to said location in said storage server;

in response to the first read from network storage command, retrieving, via said network, data requested by said first read from network storage command from said storage server;

in response to the first read from network storage command, storing, by said network interface device, said data in solid state storage coupled to said network interface device;

in response to said second read from network storage command, retrieving said data from said solid state storage instead of retrieving said data from said storage server by said network interface device;

receiving, from a second host, a write to network storage command identifying a write data segment;

storing a copy of the write data segment to said solid state storage;

transmitting a first write command causing the write data segment to be written to said storage server; and when it is determined that said storage server failed to successfully write the write data segment in response to said first write command, transmitting a second write command causing the write data segment to be written to said storage server using the copy of the write data segment stored in said solid state storage.

2. The method of claim 1, further comprising:
tagging an entry in said solid state storage associated with said data with a virtual machine identifier.

3. The method of claim 1, further comprising:
tagging an entry in said solid state storage associated with said data with a logical unit identifier.

4. The method of claim 1, further comprising:
receiving a third read from network storage command; and, overwriting said data in said solid state storage with second data requested by said third read from network storage command, from said storage server.

5. The method of claim 1, further comprising:
receiving a write to local storage command; and, overwriting said data in said solid state storage with second data associated with said write to local storage command.

6. A method of communicating with a storage server across a network, comprising:
receiving, from a host, at a network interface device, a write to network storage command directed to a location in said storage server and a read from network storage command directed to said location in said storage server;
in response to the write to network storage command, sending, via said network, data written by said write to network storage command to said storage server;
in response to the write to network storage command, storing, by said network interface device, a copy of said data in solid state storage coupled to said network interface device;
when it is determined that said storage server failed to successfully write said data in response to the sending, resending said data to said storage server using the copy of said data stored in the solid state storage; and,
in response to said read from network storage command, retrieving said data from said solid state storage instead of retrieving said data from said storage server by said network interface device.

7. The method of claim 6, further comprising:
tagging an entry in said solid state storage associated with said data with a virtual machine identifier.

8. The method of claim 6, further comprising:
tagging an entry in said solid state storage associated with said data with a logical unit identifier.

9. The method of claim 6, further comprising:
receiving a second read from network storage command; and, overwriting said data in said solid state storage with second data requested by said second read from network storage command, from said storage server.

10. A network interface device, comprising:
a first interface configured to receive a first block storage command directed to a storage server from a host;
a second interface configured to send said first block storage command to said storage server via a network, and to receive retrieved data associated with said first block storage command from said storage server;
a solid state storage controller configured to store said retrieved data in solid state storage and to retrieve said retrieved data from said solid state storage in response to a second block storage command,
wherein said network interface device is operable to:
intercept a subsequent storage command directed to said storage device and satisfy the subsequent storage command by retrieving data from said solid state storage; and
use the solid state storage to send a second write command to said storage device when it is determined that a first write command to said storage device failed.

11. The network interface device of claim 10, wherein said second interface is configured to send iSCSI commands.

12. The network interface device of claim 10, wherein said second interface is configured to send fiber channel (FC) commands.

13. The network interface device of claim 10, wherein said second interface is configured to send fiber channel over Ethernet (FCoE) commands.

14. The network interface device of claim 10, wherein said first interface is configured to receive PCI commands and said second interface is configured to send block storage commands over an internet protocol (IP) network.

15. The network interface device of claim 10, wherein said solid state storage controller is further configured to overwrite said retrieved data in said solid state storage with write data received from said first interface and to retrieve said write data from said solid state storage in response to a third block storage command.

16. A non-transitory computer readable medium having information stored thereon that describes a block of an integrated circuit network interface device, the integrated circuit network interface device, comprising:
a first interface configured to receive a first block storage command directed to a storage server from a host;
a second interface configured to send said first block storage command to said storage server via a network, and to receive retrieved data associated with said first block storage command from said storage server;
a solid state storage controller configured to store said retrieved data in solid state storage and to retrieve said retrieved data from said solid state storage in response to a second block storage command,
wherein the information includes instructions operable to:
intercept a subsequent storage command directed to said storage device and satisfy the subsequent storage command by retrieving data from said solid state storage, and
use the solid state storage to send a repeat write command to said storage server when it is determined that a previous write command to said server failed.

17. The non-transitory computer readable medium of claim 16, wherein said second interface is configured to send iSCSI commands.

18. The non-transitory computer readable medium of claim 16, wherein said second interface is configured to send fiber channel (FC) commands.

19. The non-transitory computer readable medium of claim 16, wherein said second interface is configured to send fiber channel over Ethernet (FCoE) commands.

20. The non-transitory computer readable medium of claim 16, wherein said first interface is configured to receive PCI commands and said second interface is configured to send block storage commands over an internet protocol (IP) network.

* * * * *